Feb. 21, 1950     A. SVOBODA     2,498,311
MECHANICAL DIVIDER
Filed April 1, 1946

INVENTOR
ANTONIN SVOBODA

BY *M. A. Hayes*

ATTORNEY

Patented Feb. 21, 1950

2,498,311

UNITED STATES PATENT OFFICE 2,498,311

MECHANICAL DIVIDER

Antonin Svoboda, Cambridge, Mass.

Application April 1, 1946, Serial No. 658,599

2 Claims. (Cl. 235—61)

This invention relates to a mechanical linkage for performing dividing computations, and more particularly to a mechanical divider in which all the quantities are positive in nature. The mechanism which I have invented determines the quotient of two independent variables, both of which must be positive in nature.

For general information purposes in connection with the present invention, reference is made to the textbook, Computing Mechanisms and Linkages, vol. 27, by Antonin Svoboda, Massachusetts Institute of Technology, Radiation Laboratory Series, First Edition 1948, McGraw-Hill Book Company, Inc.

An object of this invention is to provide a mechanical computer, and more particularly to provide such a computer for performing dividing computations.

Another object of this invention is to provide a mechanism for determining the quotient of two independent variables, both of which are positive in character.

A further object of this invention is to provide a mechanical computer having a pair of input sections and an output section operatively connected by a linkage system of such relative dimensions that displacement of the output section of the device is proportional to the quotient of the displacements of the input sections.

Further objects and advantages of this invention, as well as its construction, arrangement, and operation, will be apparent from the following description and claims in connection with the accompanying drawings in which:

As heretofore stated, the purpose of this invention is to provide a mechanism for determining the quotient of two independent variables. Otherwise stated, it is to solve the equation $$X=\frac{z}{y}$$

where $z$ and $y$ represent input sections of the device and $X$ represents the output section thereof.

Figure 1:
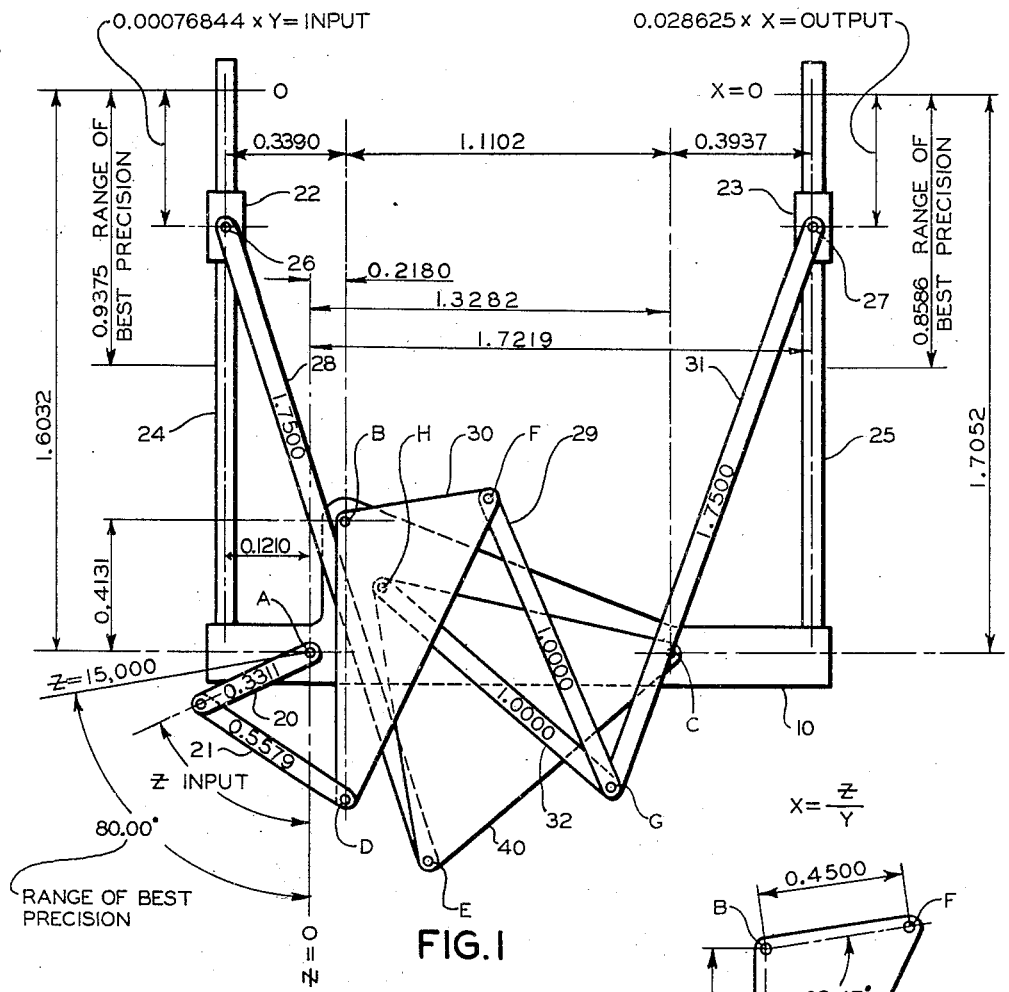
Fig. 1 is an orthographic assembly drawing of the linkage mechanism.
Figure 1A:
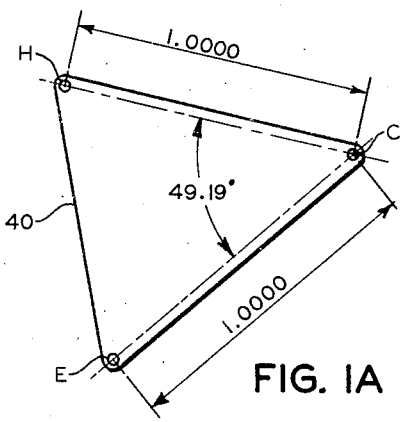
Fig. 1A is a front view of one of the swinging members of the mechanism of Fig. 1 showing the critical dimensions of the members.
Figure 1B:
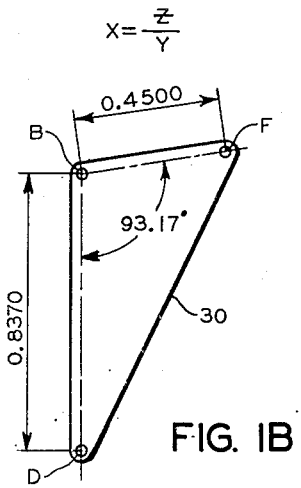
Fig. 1B is a front view of a second of the swinging members of the mechanism of Fig. 1 illustrating the critical dimensions thereof.

Fig. 1 shows the general arrangement of one embodiment of this invention and indicates that it includes three pivoted or swinging members 20, 30, 40 pivoted to a support 10 at three pivot points A, B and C, respectively. A link 21 connects the free end of arm 20 to one apex of triangular member 30 as shown at point D. A pair of slide members 22 and 23, slidably mounted on rods 24 and 25, constitute what may be termed to be means for introducing a Y input and extracting the X output from the mechanism. More specifically, the displacement of pin 26 of member 22 from its zero position constitutes the Y input, while the X output is represented by the displacement of pin 27 of member 23 from its zero position. A link 28 pivotally connects slide block 22 with member 40 at point E. Point F of member 30 and pin 27 of slide block 23 are operatively connected by a pair of links 29 and 31, having the free ends thereof connected together by a pin connection at point G. A final link 32 operatively connects point H of member 40 to point G, the junction point of links 29 and 31 as shown.

If we allow unity, that is 1, to be a basis of measurement, the relative dimensions of the various members of the mechanism are as follows:

| | |
|---|---|
| Horizontal distance from pivot point A to pivot point B | .2180 |
| Vertical distance from pivot point A to pivot point B | .4131 |
| Horizontal distance from pivot point A to pivot point C | 1.3282 |
| Vertical distance from pivot point A to pivot point C | 0 |
| Horizontal distance from pivot point A to the axis of travel of slide block 22 | .1210 |
| Vertical distance from pivot point A to the point where Y=0, that is where the variable introduced by member 22 is equal to zero | 1.6032 |
| Horizontal distance from pivot point A to axis of travel of slide block 23 | 1.7219 |
| Vertical distance from pivot point A to the point where the X output shown by displacement of slide block 23 is equal to zero | 1.7052 |
| Length of member 20 | .3311 |
| Length of member 21 | .5579 |
| Length of member 28 | 1.7500 |
| Length of member 29 | 1.0000 |
| Length of member 31 | 1.7500 |
| Length of member 32 | 1.0000 |
| Length of member 30 along the line BF thereof | .4500 |
| Length of member 30 along line BD thereof | .8370 |
| Angle included between lines BF and BD of member 30 | 93.17° |
| Length of member 40 along the line CH thereof | 1.0000 |
| Length of member 40 along the line CE thereof | 1.0000 |
| Angle included between lines CH and CE of member 40 | 49.19° |

It is to be understood that the relative dimensions given may be varied by as much as (.02) without impairing the operation of the device.

In operation, the computation performed by this linkage is $$X=\frac{z}{y}$$

where the angle included between link 20 and the vertical zero line through pivot point A represents the Z input, the displacement of pin 26 of slide block 22 from its zero position constitutes the y input, and the displacement of pin 27 of slide block 33 from its zero position represents the X output. As indicated in Fig. 1, the mechanism is arranged such that the displacement of member 20 may be varied between 0° and 80°, this range of displacement representing a Z input ranging between 0 and 18,000. The 80° arc is uniformly graduated between 0 and 18,000 in the present application of the computer, or may be uniformly graduated with a different scale if a different range of Z input values is required. The X and Y scales are also uniformly calibrated. Link 28 and that portion of member 40 connecting points E and C thereof may be considered to represent the y input section. Links 31, 29, 32 and that portion of member 40 connecting points C and H may be considered to represent the X output section. The z input section is represented by arm 20, link 21 and that portion of member 30 connecting points B and D thereof.

It is to be observed that triangular member 30 might easily be replaced by a pair of equivalent lengths extending from points B to F and from point B to point D provided the lengths are rigidly linked together at point B. This linkage might be accomplished by a shaft to which each link would be rigidly secured. The angular relationship between the equivalent links would thereby be determined by the linear dimensions given them. In like manner, member 40 might easily be replaced by a pair of links connecting points E and C and C and H provided that such lengths be rigidly secured to each other at point C. The angle included between such links would be automatically determined by the length of the links. The ranges of best precision of operation of the device as well as the scale factors for X and Y are shown in Fig. 1. As shown in the figure for best precision in operation, the displacement of pin 26 from the zero point of the Y input should not exceed .9375. Likewise, the displacement of pin 27 of member 23 should not exceed .8586. The displacement of arm 20 from the line Z=0 should not exceed 80° in order to secure most accurate results.

While a particular embodiment of my invention has been disclosed and described, it is to be understood that various changes and modifications may be made therein without departing from the scope and spirit of the appended claims.

What is claimed is:

1. A mechanical computer for determining the quotient of two independent variables comprising a support, first and second rods extending in coplanar relation from said support said first and second rods being uniformly calibrated from a zero position toward said support, a first slide block slidably mounted on said first rod, a second slide block slidably mounted on said second rod, an arm pivotally mounted on said support, a first triangular swinging member pivotally mounted on said support, a second triangular swinging member pivotally mounted on said support, a first link operatively connecting said arm and one apex of said first triangular member, a second link operatively connecting said first slide block and one apex of said second triangular member, third and fourth links operatively connecting said second slide block and a second apex of said first triangular member, and a fifth link operatively connecting the junction point of said third and fourth links and a second apex of said second triangular member, said arm, said links, and said swinging members having the following relative dimensions where the basis of measurement is taken as unity (1)

| | |
|---|---|
| Length of said arm | .3311 |
| Length of said first triangular swinging member from the pivot point thereof to one apex thereof | .8370 |
| Length of said triangular swinging member from the pivot point thereof to the other apex thereof | .4500 |
| Angle included between lines drawn from the pivot point of said triangular member to said apices | 93.17° |
| Length of said second triangular member from the pivot point thereof to one apex thereof | 1.000 |
| Length of said second triangular member from the pivot point thereof to the second apex thereof | 1.000 |
| Angle included between lines drawn from said pivot point to said apices | 49.19° |
| Length of said first link | .5579 |
| Length of said second link | 1.7500 |
| Length of said third link | 1.7500 |
| Length of said fourth link | 1.000 |
| Length of said fifth link | 1.000 |
| Horizontal distance between said first and second rods | 1.8429 |
| Vertical distance from the pivot point of said arm to said zero position of said first rod | 1.6032 above |
| Vertical distance from the pivot point of said arm to the pivot point of said first triangular swinging member | .4131 above |
| Horizontal distance from the pivot point of said arm to the center line of said first rod | .1210 to left |
| Horizontal distance from the pivot point of said arm to the pivot point of said first triangular swinging member | .2180 to right |
| Horizontal distance from the pivot point of said arm to the pivot point of said second triangular swinging member | 1.3282 to right |
| Vertical distance from the pivot point of said arm to said zero position of said second rod | 1.7052 above |

The aforementioned dimensions and orientation being such that the displacement of said second slide block is proportional to the quotient of the displacements of said arm and said first slide block.

2. A mechanical computer for determining the equation $$x = \frac{z}{y}$$

where z and y represent independent variables, said computer comprising a support, first and second rods extending in coplanar parallel relation from said support, said first and second rods being uniformly calibrated from a zero position located near the ends of said rods furthest removed from said support toward said support, a first slide block slidably mounted on said first rod, a second slide block slidably mounted on said second rod, the movement of said first and second blocks from their respective zero positions on said rods being adapted to indicate positive values of y and x respectively, an arm pivotally mounted on said support in substantially coplanar relationship with said rods and being adapted for movement through an arc of approximately 90 degrees from a line passing through the pivot point of said arm which is substantially parallel to said rods to a line which is substantially perpendicular thereto, said arc being uniformly calibrated from a zero position at said parallel line toward said perpendicular line and representing positive values of said variable z, a first triangular swinging member pivotally mounted on said support, a second triangular swinging member pivotally mounted on said support, a first link operatively connecting said arm and a first unpivoted apex of said first triangular member, a second link operatively connecting said first slide block and a first unpivoted apex of said second triangular member, third and fourth links operatively connecting said second slide block and a second unpivoted apex of said first triangular member, and a fifth link operatively connecting the junction point of said third and fourth links and a second unpivoted apex of said first triangular member, said arm, said links, and said swinging members having the following relative dimensions and orientation where the basis of measurement is taken as unity (1),

| | |
|---|---:|
| Length of said arm | .3311 |
| Length of said first triangular member from the pivot point thereof to the said first unpivoted apex thereof | .8370 |
| Length of said first triangular member from the pivot point thereof to the said second unpivoted apex thereof | .4500 |
| Angle included between lines drawn from the pivot point of said first triangular member to the said first and second unpivoted apices thereof | 93.17° |
| Length of said second triangular member from the pivot point thereof to the said first unpivoted apex thereof | 1.000 |
| Length of said second triangular member from the pivot point thereof to the said second unpivoted apex thereof | 1.000 |
| Angle included between lines drawn from the pivot point of said second triangular member to the said first and second unpivoted apices thereof | 49.19° |
| Length of said first link | .5579 |
| Length of said second link | 1.7500 |
| Length of said third link | 1.7500 |
| Length of said fourth link | 1.000 |
| Length of said fifth link | 1.000 |
| Distance between said first and second rods | 1.8429 |
| Vertical distance from the pivot point of said arm to said zero position on said first rod | 1.6032 above |
| Horizontal distance from the pivot point of said arm to the center line of said first rod | .1210 to left |
| Vertical distance from the pivot point of said arm to the pivot point of said first triangular swinging member | .4131 above |
| Horizontal distance from the pivot point of said arm to the pivot point of said first triangular swinging member | .2180 to right |
| Horizontal distance from the pivot point of said arm to the pivot point of said second triangular swinging member | 1.3282 to right |
| Vertical distance from the pivot point of said arm to said zero position of said second rod | 1.7052 above |
| Vertical distance between the pivot point of said arm and the pivot point of said second triangular swinging member | 0.000 |
| Range of movement for best precision of said first slide block along said first rod from its said zero point toward said support | .9375 |
| Range of movement for best precision of said second slide block along said second rod from its said zero point toward said support | .8586 |
| Scale factor for said first rod ($y$-scale) | 0.00076344 |
| Scale factor for said second rod ($x$-scale) | 0.028625 | the aforementioned dimensions and orientation being such that the displacement of said second slide block is proportional to the quotient of the displacement of said arm and said first slide block.

ANTONIN SVOBODA.

REFERENCES CITED

The following references are of record in the file of this patent:

UNITED STATES PATENTS

| Number | Name | Date |
|---|---|---|
| 2,193,095 | Harrison | Mar. 12, 1940 |
| 2,272,256 | Vogt | Feb. 10, 1942 |
| 2,394,180 | Imm | Feb. 5, 1946 |

FOREIGN PATENTS

| Number | Country | Date |
|---|---|---|
| 113,136 | Great Britain | Feb. 7, 1918 |
| 278,380 | Great Britain | May 10, 1928 |
| 512,073 | Germany | Nov. 6, 1930 |